Feb. 20, 1951    G. H. FETTERLEY    2,542,916
APPARATUS FOR THE PRODUCTION OF BORON
Filed Aug. 3, 1945    4 Sheets-Sheet 1
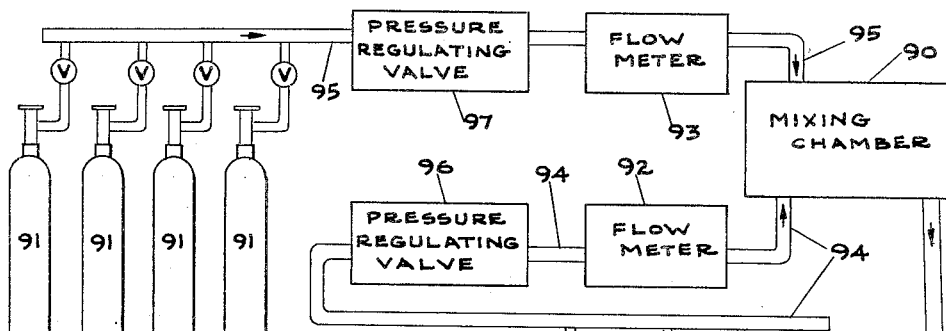
Fig. 1
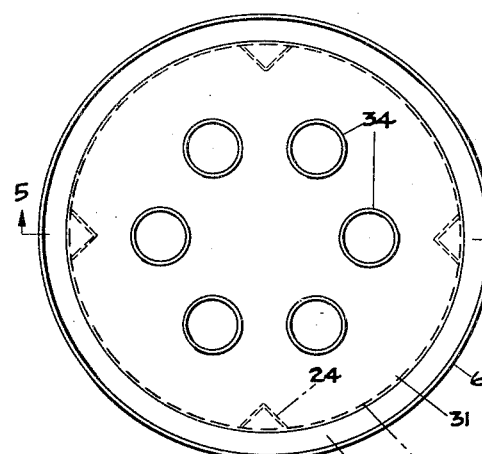
Fig. 4
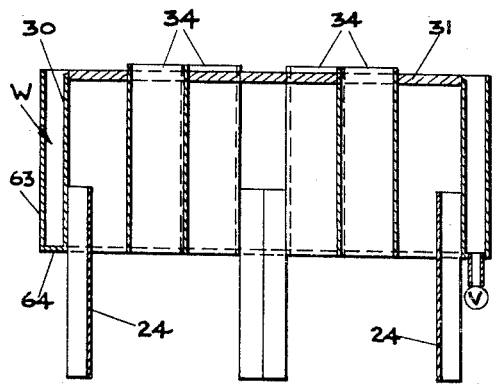
Fig. 5
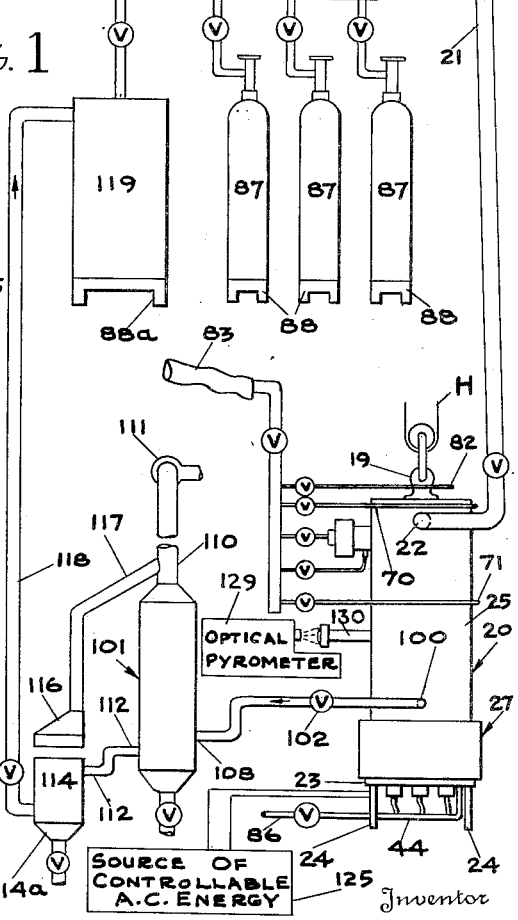
Guy H. Fetterley
By William T. Kiesmer
Attorney

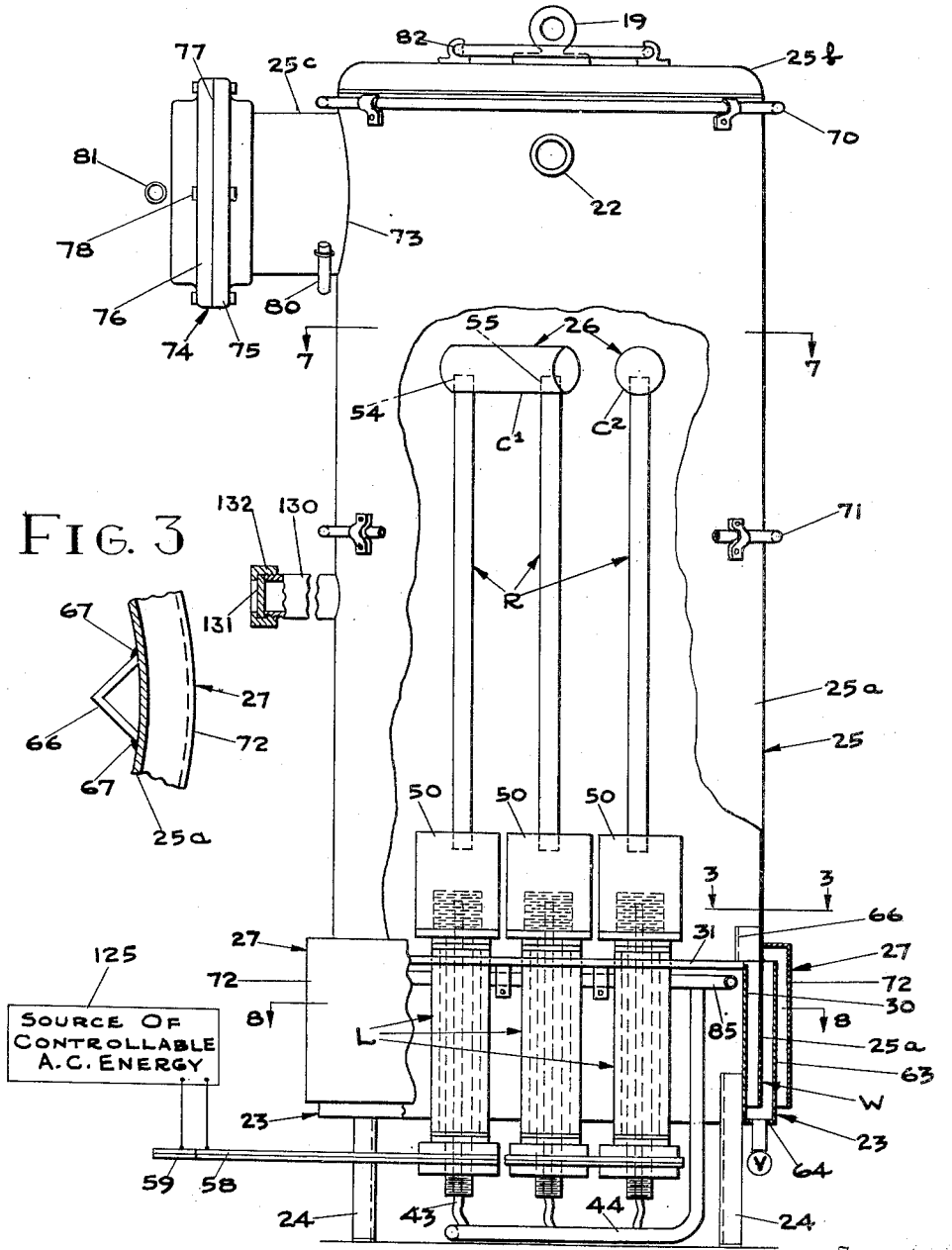

Feb. 20, 1951  G. H. FETTERLEY  2,542,916
APPARATUS FOR THE PRODUCTION OF BORON
Filed Aug. 3, 1945  4 Sheets-Sheet 3
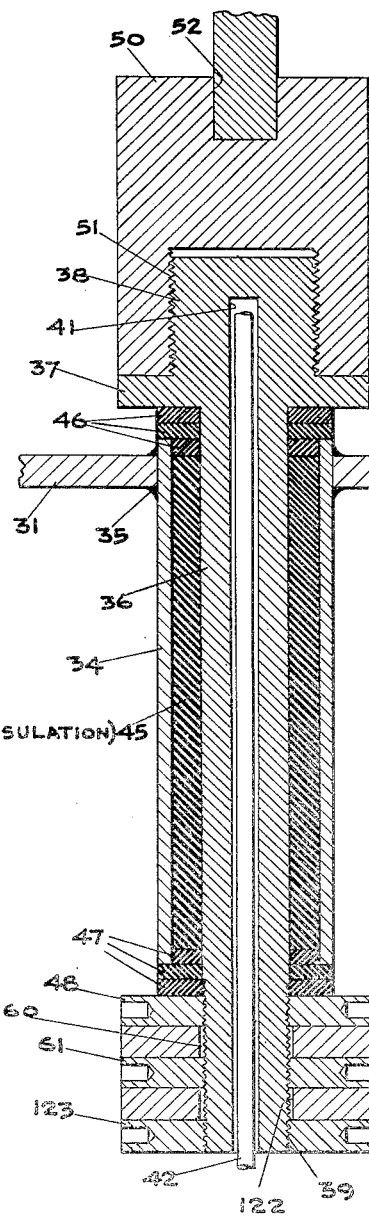
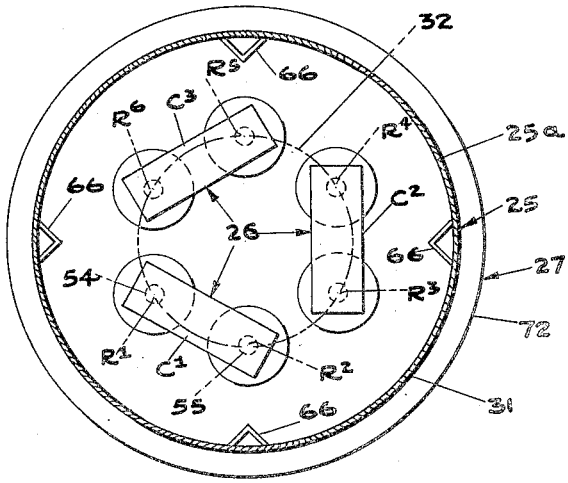
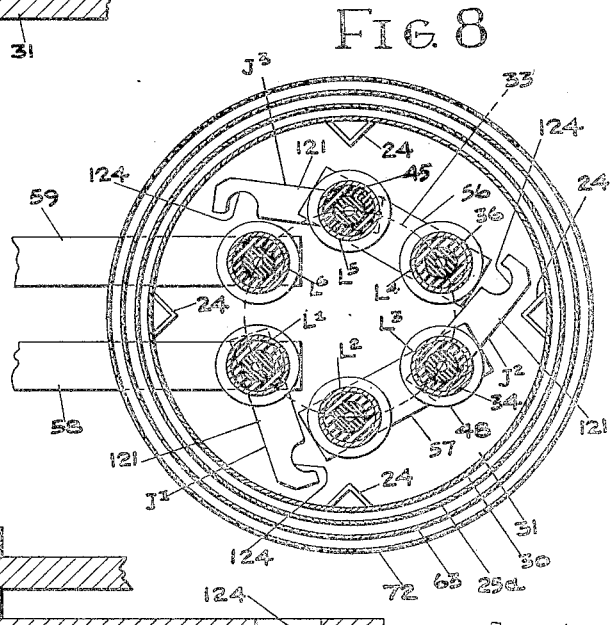
Inventor
GUY H. FETTERLEY
By William T. Kremer Attorney Feb. 20, 1951     G. H. FETTERLEY     2,542,916
APPARATUS FOR THE PRODUCTION OF BORON
Filed Aug. 3, 1945     4 Sheets–Sheet 4
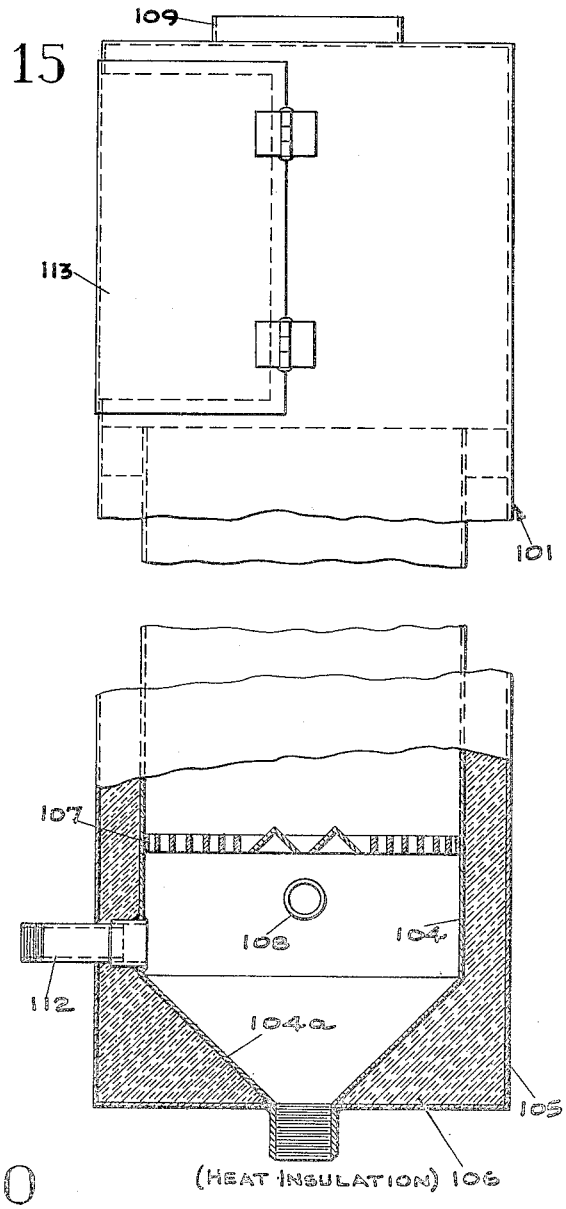
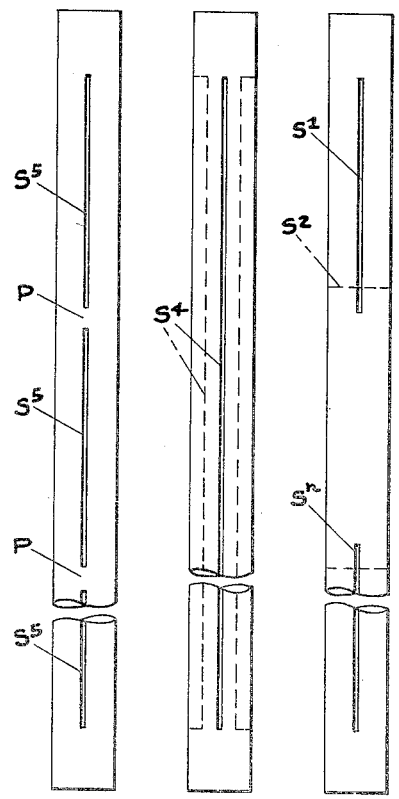
Inventor
GUY H. FETTERLEY
By William T. Kueven
Attorney Patented Feb. 20, 1951

2,542,916

UNITED STATES PATENT OFFICE 2,542,916

APPARATUS FOR THE PRODUCTION OF BORON

Guy H. Fetterley, Chippawa, Ontario, Canada, assignor to Norton Company, Worcester, Mass., a corporation of Massachusetts Application August 3, 1945, Serial No. 608,736

11 Claims. (Cl. 23—277)

This invention relates to the production of high purity boron.

It has heretofore been proposed to produce boron by reacting boron trichloride and hydrogen by passing the reactants over electrically heated wires of a refractory metal such as tungsten, the reaction being represented by the following: $2BCl_3 + 3H_2 = 2B + 6HCl$. One of the objects of this invention is to provide an improved method and apparatus for producing boron according to the above reaction and to avoid or overcome the disadvantages in the use of wires such as the above-mentioned tungsten wires in carrying on such reduction of chlorinated boron to boron. Another object is to provide a rugged apparatus or system for dependable reduction of chlorinated boron to boron well adapted to withstand the severe conditions of temperature and capable of boron production on a quantity scale. Another object is to provide a reliable and easily controllable system and apparatus of the above-mentioned nature in which electrical energy on a high order of magnitude can be safely and effectively employed. Another object is to provide an apparatus of the above-mentioned character in which physical recovery from the apparatus of the produced product may be effected in a simple and dependable manner and segregation thereof from other elements, either elements of the apparatus employed or elements in the nature of a reaction product, is facilitated. Another object is to provide electrically heated conductive elements or electrodes for the deposition thereon of the reaction product, namely boron, that will be of high current-carrying capacity, durable, and lasting under the peculiar conditions of high temperature and the like, and constructed and coacting so as to dependably avoid certain destructive action or tendencies caused by the deposited material. Another object is to provide simple and dependable means for mounting and demounting the conductive or electrode elements. Another object is to provide simple and effective means or arrangement for insuring high velocity of movement or circulation of the reactants relative to the high-temperature conductive or electrode elements and thus improve the efficiency of production of boron. Another object is to provide for the simple and dependable control of the reactants, the reaction to which they are subjected, and the byproducts and reaction product produced thereby. Other objects are, in general, to provide an improved method and apparatus of the above-mentioned nature and to provide an improved boron reaction product, and other objects will be in part obvious or in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the following claims.

In the accompanying drawings, in which are shown preferred embodiments of the mechanical features of my invention, Fig. 1 is a schematic or diagrammatic representation of the system and apparatus employed;

Fig. 2 is a front elevation of a resistor furnace structure, certain parts being broken away and certain other parts being shown in section;

Fig. 3 is a detached fragmentary horizontal view, on an enlarged scale, as seen along the line 3—3 of Fig. 2, showing an internal supporting element of one of the furnace parts;

Fig. 4 is a plan view of the base or bottom of the resistor furnace structure, certain parts being omitted;

Fig. 5 is a vertical sectional view as seen along the line 5—5 of Fig. 4;

Fig. 6 is a vertical central sectional view, on an enlarged scale, showing the insulated lead-in or terminal and supporting construction related to the furnace bottom or base, one for each conductive or electrode element;

Fig. 7 is a horizontal sectional view of the resistor furnace as seen along the line 7—7 of Fig. 2;

Fig. 8 is a horizontal sectional view thereof as seen along the line 8—8 of Fig. 2;

Figs. 9, 11, and 13 are elevations, on a larger scale, of the conductive elements or electrodes, and Figs. 10, 12, and 14 the respective end views thereof; and Fig. 15 is a front elevation of a condenser construction, certain parts being broken away and certain parts being shown in vertical section.

Similar reference characters refer to similar parts throughout the several views of the drawings.

In Fig. 1 is schematically or diagrammatically shown the principal elements of apparatus usable in my method, and to facilitate a readier understanding of certain features of my invention, the resistor furnace, generally indicated in Fig. 1 by the reference character 20, may first be considered, it being sufficient at this point to note that a suitable mixture of boron trichloride and of hydrogen, all as is later described in greater detail, may continuously be supplied to the furnace 20 by way of a pipe 21 having a suitable connection to the furnace at an appropriate upper point therein, as indicated at 22, to be passed or circulated interiorly of the furnace relative to an electrode or resistor furnace maintained electrically at high temperature, all as is later described in detail.

The furnace 20 of Fig. 1 is preferably constructed of two separable parts, a bottom or base 23 provided with suitable legs or standards 24 to support it at appropriate height above the floor level, and an upper part 25 hereinafter termed the "furnace shell" or "shell." Conveniently the parts are circular in horizontal cross-section and are made of suitably heavy sheet steel, the shell 25 being preferably of considerable height not only appropriately to accommodate therein an upstanding annularly or circularly arranged electrode structure, which is designated as a whole by the reference character 26, but also to coact in achieving certain thermal relationships later described whereby I am enabled to initiate and maintain a high velocity of movement of the reactants hydrogen and boron trichloride relative to the upstanding electrode or resistor structure. The electrode structure 26 comprises preferably a plurality of upstanding rod-like elements of suitable refractory material having appropriate resistance so as to become adequately heated up by the flow therethrough of electrical energy; these rod-like elements are designated as a group by the reference character R. Since it is upon these elements that the boron is deposited as is later described, I prefer, in order to gain access to these elements, to mount or support them in or from the furnace bottom part 23 and arranged to have the shell 25 removable from the bottom part, as by lifting or hoisting it to a sufficient extent while maintaining it coaxial with the bottom part 23. The latter and the shell I, therefore, provide with a sealed junction that is readily separable for the above purpose and that restores the sealed junction upon reassembly of the shell by downward movement onto the bottom part; this separable seal or junction is generally indicated by the reference character 27 and is preferably constructed as is later described.

The bottom 23 preferably comprises an inner cylindrical shell 30 of substantial axial dimension (Fig. 2) closed off at its upper end by a plate 31 welded thereto; inasmuch as the plate 31 forms in effect the bottom of the interior of the furnace shell 25, as will later be better understood, it will be referred to hereafter as the bottom plate. To the inside face of the bottom shell 30 are secured, as by welding, the above-mentioned legs or standards 24, illustratively four in number (see Fig. 8), and of substantial length, thus to provide a space underneath the bottom plate 31 to accommodate, in depending relation from the bottom plate 31, the lead-in structures which also serve as mechanical supports for the several rod-like resistor elements above mentioned. These lead-in elements are designated in Fig. 2 as a whole or as a group of the reference character L, and they are of identical construction so that the description of one will suffice for all. Each provides a terminal connection and a mechanical support for one of the rods of the group R, and the rods of the group R are preferably arranged each parallel to each other and equi-distantly spaced from the axis of the furnace structure, and hence, as is shown in Fig. 7, they may be arranged in a circle indicated at 32 along the circumference of which they are preferably equi-angularly spaced. Any suitable number may be employed and for purpose of illustration I have shown six, indicated in Fig. 7 at $R^1$, $R^2$, $R^3$, $R^4$, $R^5$, and $R^6$. The radius of the circle 32 in relation to the radius of the shell 25, is such as to provide an outer annularly cross-sectioned zone or passageway externally bounded by the inner walls of the shell 25, of a cross-sectional area just about equal to the cross-sectional area of a circularly cross-sectioned zone or passageway of a diameter somewhat greater than the diameter of the circle 32. As will later be seen, downward movement of the mixed reactants or boron trichloride and hydrogen is to take place in the outer or annular zone, and upward movement thereof is to take place in the inner zone or passageway in which are the highly-heated rod-like elements, such movements comprising in effect a high-velocity circulation and recirculation, being maintained throughout the reaction. I have found that a suitable relationship is to have the radius of the circle 32 equal to about half the radius of the shell 25.

In the bottom plate 31, Figs. 2 and 8, lead-in structures L, also six in number, are similarly spaced about a circle 33 which is of the same radius as the circle 32 of Fig. 7, and in Fig. 8 the lead-in and supporting structures are indicated by the reference characters $L^1$, $L^2$, $L^3$, $L^4$, $L^5$, and $L^6$ for the rod elements $R^1$, $R^2$, $R^3$, $R^4$, $R^5$, and $R^6$ respectively, and individually they may be constructed as is better shown in Fig. 6.

Each lead-in supporting structure comprises a metal sleeve 34, welded, as at 35, to the walls of a hole in the bottom plate 31, thus making a sealed joint and supporting the metal sleeve 34 in depending relation, with its lower end extending below the plane of the shell 30 of the bottom structure 23. Extending coaxially through the sleeve 34, but spaced inwardly therefrom, is a heavy metal conductor 36 which may be of cast bronze provided at its upper end with a flange 37 beyond which extends a threaded stud-like portion 38 and externally threaded at its lower end, as at 39. It is of large cross-section adequate to carry large current, current on the order of 4,000 or 5,000 amperes, and it is preferably made hollow, as at 41, so as to receive therein, but spaced from the walls of the coaxial interior 41 thereof, a pipe 42 which, as is better shown in Fig. 2, is connected by a rubber or other non-conductive connecting tube 43 to a water supply pipe 44 so that through the pipe 42 a continuous flow of water may be supplied to the interior walls of the chamber 41 and thus withdraw heat from the conductive element 36 and prevent it from unduly rising in temperature.

In the space between the heavy conductor 36 and the sleeve 34 I provide a suitable heat-resistant and insulating medium, indicated at 45 in Fig. 6. This medium may comprise a compound of a heat-resistant material, such as asbestos, and a heat-settable bonding agent, such as Bakelite. Such a composition is packed into the space between the parts 36 and 34 and heat-set, thus forming also a dependable sealed joint between these two parts, as well as a good heat-resisting insulator.

Conveniently the insulator 45 may be made up out of asbestos rope and powdered, uncured, resinous material such as the Bakelite above mentioned, packed in place, utilizing a stack of washers 46 at the upper end of the metal sleeve 34 and a stack of washers 47 at the lower end, both made of a suitable heat-resistant insulating material such as relatively hard or stiff resin-bonded asbestos board, whence a clamping nut 48 on the lower threaded end 39 of the conductor 36 may be turned home to axially compress certain of the washers against the respective ends of the sleeve 34 and to cause the innermost washers which are receivable within the sleeve 34 to more tightly compact the mixture of ingredients packed in the space between the parts 36 and 34. Subsequent heating matures or sets the resin, and this may be done in any desired way and may even be done by utilizing the heat produced in the adjacent parts during the initial run of the furnace, thus to complete the insulating sealed joint and insure also the rigid mounting of the heavy conductive part 36 relative to the bottom plate 31. It may thus serve, by way of the threaded stud part 38 thereof, as a dependable support for one of the resistor elements or rods above mentioned.

The latter are preferably made of graphite and may be of a diameter on the order of two inches. Each is supported in upright position from the threaded stud-like part 38 of the lead-in conductor 36 by a large or massive cylindrical block 50 (Fig. 6) of graphite, preferably of high-grade graphite, provided at its lower end with an internally-threaded recess or bore 51 by which it is threaded onto the thread of the stud 38 and tightened up or jammed against the heavy peripheral shoulder 37. The part 50 is of cylindrical construction and in its upper face it has a coaxial recess 52 of substantial depth forming in effect a socket in which the lower end of the graphite resistor rod is neatly and snugly received, preferably by way of a "push" fit. Each rod is thus dependably supported in upright position and may be removed or replaced with facility.

As will later appear, the high temperature necessary for the reaction, a temperature on the order of 1,400° C., is to be created by the $I^2R$ loss in the resistor rods, and by making the rod-supporting graphite blocks 50 (Fig. 6) massive and of large cross-sectional area relative to the cross-section of the rod itself, heat losses in the graphite block or support 50 are cut down so that the depositing of solid reaction product on the surfaces of the supporting block 50 does not take place. The large external surface area of the block 50 aids in preventing material temperature rise in the support 50 itself, the above-mentioned circulation of gaseous reactants coacting with this large surface area to withdraw heat therefrom, and these actions are in turn aided by the internal water cooling and heat withdrawal effected by way of the water channel or chamber 41 in the metallic stud portion 38 which extends materially into the graphite supporting block 50 and can thus coact to effect heat withdrawal therefrom. Though the operating temperature of the resistor rods may be on the order of 1,400° C., appropriate for the deposition thereon of the reactant product as later described, it is possible, in the above-described manner, to maintain the temperature of the supporting block 50 at values of 700° C. or under and these are inappropriate to maintain the reaction, and hence no material deposition on the support 50 takes place.

The various resistor rods R of Figs. 2, 7, and 8 may be electrically interconnected at their upper ends and hence internally of the furnace, and may be electrically interconnected externally of the furnace by way of the several lead-in structures L depending from the furnace bottom or base part 23, in any suitable way, and by way of the lead-in structures L connected to a suitable source or sources of electrical energy, and with the mounting and arrangement above described, a wide flexibility of electrical arrangement is possible not only for normal operation of the furnace, but also to meet varying conditions or emergencies that might arise during continued operation of the furnace. A preferred manner of electrically connecting the above-mentioned parts will now be described and which will serve as illustrative.

Whatever interconnections are made at the upper ends of the rods R as viewed in Fig. 2 or Fig. 7, the connecting means employed, being confined to the upper ends of the rods and carried by them, is free-floating in the sense that such connecting means moves upwardly or downwardly with the thermal expansion and contraction of the rods R upon heating and cooling, and with all the rods subjected to the same temperature changes, no rod becomes subjected to breaking, cracking, or rupture strains or stresses. Preferably the rods are electrically connected in pairs at their upper ends, and hence their number is an even number such as the illustrative six, and in Figs. 2 and 7 I have shown the upper ends of rods $R^1$ and $R^2$, $R^3$ and $R^4$, and $R^5$ and $R^6$ connected together by connecting elements $C^1$, $C^2$, and $C^3$ respectively, thus forming three loop circuits each comprising two resistor rods and a connecting element, so as to insure, since the same magnitude of current passes through the two rods of the loop circuit, substanitally identical synchronous dimensional changes in each in response to current changes in the loop circuit. The two rods of each loop circuit thus expand and contract in unison and neither can impose detrimental strain upon the other.

The connecting elements $C^1$, $C^2$, and $C^3$ preferably comprise massive blocks of high-grade graphite, preferably and conveniently solid cylindrical construction, each provided with appropriately spaced, parellel, cylindrical bores 54 and 55 into which the upper ends of the roads are neatly and snugly received preferably by a "push" fit, the resulting mechanical and electrical connection being much the same as that above described in connection with the assemblage of the lower ends of the rods to their respective graphite supporting blocks 50 (Fig. 6). The connecting elements $C^1$, $C^2$, and $C^3$ may thus be conveniently and readily removed from the upper ends of the rods whenever it is necessary to remove or replace the latter, and reassembly can be achieved with quick facility.

By such relative proportions as are indicated in Figs. 2 and 7, the current density in these connecting elements is low, their large cross-sectional area makes them of relatively low resistance, and the $I^2R$ losses therein are of relatively small magnitude, as is desired. Furthermore, each has a very large external surface for radiation of heat therefrom, and heat withdrawal therefrom is in turn enhanced by the gaseous reactants that move over them in large quantity and at high velocity. These connecting yoke-like elements are thus precluded from achieving high temperature sufficiently to cause the above reaction to take place, and hence reaction products are not deposited on them, their operating temperature being on the order of 700° C. or less in comparison to the much higher operating temperature of the resistor rods which are effective to achieve the reduction reaction. These resistor rods may be of a length on the order of four feet, and the socket-like recesses into which their respective ends are received as above described may conveniently be of a depth on the order of the diameter of the rods themselves.

At their lower ends, that is, by way of the lead-in or terminal and supporting structures L, the several loop circuits, illustratively three above described, may be electrically connected with each other or with a suitable source or sources of electrical energy, as may be desired, but preferably the several loop circuits are connected in series so that with substantial equality of dimensional and resistivity characteristics for all of the resistor rods, all become subjected to the same value of current, the heat energy, represented by $I^2R$, produced in each will be the same, thermal changes will be the same throughout, and they all will respond synchronously and in like manner to resulting dimensional changes, and production at and deposition on the several resistor rods of the solid reaction product may in this manner be more easily made to take place at the same rate. The series connection of the three loop circuits is preferably effected by appropriate metal jumpers or connectors of which, for three loop circuits, only two are needed, as is indicated in Fig. 8 wherein is shown a heavy connecting bar 56 bridged across from the lead-in $L^5$ to the lead-in $L^4$, and a similar heavy connecting block 57 bridged across from the lead-in $L^3$ to the lead-in $L^2$, in which case the lead-ins $L^1$ and $L^6$ are the terminals to which the source of electrical energy is connected as by the heavy bus bars 58 and 59 (Figs. 8 and 2). The connecting blocks, as well as the ends of the bus bars, are provided with holes, of which one is indicated at 60 in Fig. 6, that take over the projecting portion of the threaded part 39 of the heavy lead-in conductive element 36, and by means of a nut 61 the bus bar or the connecting jumper is tightly clamped against the nut 48.

With such an arrangement of the electrical connections, the three loop circuits comprising respectively the resistor rods $R^1$ and $R^2$, $R^3$ and and $R^4$, and $R^5$ and $R^6$, are connected in series, and with the bus bars 58 and 59 connected to a suitable source of electrical energy, preferably an A. C. source, the series circuit, and hence the resistor elements, may be energized and the resistor rods brought up to the desired temperature. The current in the circuit may be on the order of from 3,000 to 4,000 amperes at a voltage on the order of from 100 to 175 or so, and the energy input to the apparatus may be on the order of 500 kilowatts, for an apparatus of the dimensional characteristiccs above indicated with respect to the electrical resistor circuit thereof.

The furnace shell 25 has a cylindrical side wall 25$^a$ and a top closing wall 25$^b$, and at its lower end is of a diameter larger than the diameter of the inner shell 30 of the base or bottom 23 (see Fig. 2) so as to be received in spaced relation about the inner shell or wall 30 and within an outer cylindrical shell 63 which is secured at its bottom by an annular plate or wall 64 (see also Figs. 4 and 5) to the inner shell 30, thus forming an annular well W which contains a suitable liquid to a suitable depth to form a liquid-seal between the furnace bottom or base 23 and the furnace shell 25. The well W is of a suitable depth in relation to the density of the liquid employed therein and to the relative inside and outside pressure within the shell 25; the lower end of the shell wall 25a reaches down into the well W but is held spaced upwardly from the bottom wall 64 of the well by a suitable number of internal supports 66 (Figs. 2, 3, and 7) secured to and projecting inwardly from the wall 25$^a$ so as to rest upon the peripheral portion of the bottom plate 31 or inner shell 30 of the bottom 23. These supports may be short sections of angle-iron welded to the shell as at 67 (Fig. 3), with their lower edges in the same plane.

Suitable means are provided to separate the bottom structure 23 from the shell 25, as by raising the latter relative to the former, and such means may comprise a heavy eye 19 at the center of the top of the shell, and a chain or other suitable hoist, indicated in Fig. 1 at H. The various conduit or pipe connections, later mentioned, to the furnace shell 25 therefore preferably include suitable readily detachable connections or hinged joints, or even suitable lengths of flexible conduit, so that the furnace shell 25 may be raised and lowered without having to disrupt such connections.

I also provide suitable means for abstracting heat from the walls of the furnace shell 25, and a convenient heat-abstracting medium can comprise water. For example, extending about and suitably secured to the upper end of the side wall 25$^a$ of shell 25 is a ring-shaped pipe 70 provided with holes to direct or emit a copious and uniformly distributed flow of water inwardly against the outer cylindrical wall 25$^a$, and the ring pipe 70 may be supplemented by similar means spaced downwardly therefrom, such as the ring-shaped conduit 71 positioned about and supported by the shell at an intermediate point in its height. By such means as these a continuous sheath or layer of water may be kept running over and down the external surfaces of the shell 25, the lower end of which is provided with a sheet-metal skirt 72 shaped as shown in Fig. 2 to overlie and overhang the outer wall of the well W and thus prevent the downwardly streaming water from getting into the well. The top wall 25$^b$ is also water-cooled, as later described.

At a suitable point in the shell 25 I prefer to provide a safety diaphragm constructed to give way should the desired critical pressure within the furnace be reached or exceeded and to quickly vent or open the interior of the furnace to the atmosphere. For this purpose I may provide at the upper end of the shell 25 (Fig. 2) a lateral cylindrical extension 25$^c$ of relatively large diameter, which may be secured in a suitable round opening in the shell 25 as by welding at 73, the extension 25$^c$ mounting at its outer end the safety diaphragm structure, which is generally indicated by the reference character 74. That may comprise an inner flange 75 in sealed connection with the extension 25$^c$ and an outer annular flange 76 between which is clamped a disk-like large-diametered diaphragm 77, the clamping flanges being provided with suitable clamping screws or bolts 78. The diaphragm 77 may be of relatively thin metal in sheet form, of lead or suitable lead alloy, and dimensioned to give way at the desired critical value of internal pressure. The safety diaphragm structure is preferably also arranged to be cooled externally as by water spray pipes 80 and 81 to supply water to surfaces that would not be adequately supplied with water from the upper ring pipe 70. Preferably also the top wall 25ᵇ of the furnace shell 25 has secured to it a ring pipe 82 to spray water downwardly onto the top wall 25ᵇ. All of the spray pipes are connected together in any suitable way, as indicated in Fig. 1, and connected to a suitable source of water supply by a flexible conduit 83, suitable valves being provided where needed, as indicated in Fig. 1, to give individual control, if desired, to the rate of water supply to the individual spray pipes.

Desirably also I provide a ring pipe 85 within the base or bottom structure 23 (see Fig. 2) and provided with holes to direct water upwardly against the bottom plate 31 and outwardly against the inside face of the shell 30. The ring pipe 85 is secured in place in any suitable way, and may be permanently connected to a water supply pipe-line 86 (Fig. 1) with a suitable valve control as there indicated. This connection need not be flexible since the bottom 23 can remain stationary on the floor.

Into the interior of the furnace and to the upper part thereof, as by the above-mentioned pipe connection 22 (Figs. 2 and 1) I supply to the furnace a suitable mixture of boron trichloride and hydrogen. Boron trichloride boils at 13° C. and in vapor form it may be supplied from suitable containers or cylinders 87 (Fig. 1) which may be provided, if desired, with suitable heaters 88, to a mixing chamber 90 to which is also supplied hydrogen from suitable containers or cylinders 91, the pipe 21 leading the mixture from the chamber 90 to the interior of the furnace 20. Suitable flow meters or the like 92 and 93 are included in the lines 94 and 95 leading to the mixing chamber 90 together with regulating valves 96 and 97 so that the gas hydrogen and the boron trichloride vapor can be continuously supplied to the mixing chamber 90 at the desired relative rates and proportion. A molecular ratio of the boron trichloride to the hydrogen of 1 to 5 is the desired ratio at which the earlier above set forth reaction should take place and the metering and regulating devices are appropriately set to maintain, volumetrically, a steady flow to the mixing chamber of the two gaseous mediums in this molecular ratio corresponding to which the volumetric ratio happens to be just about the same. This is to say, for each unit volume of boron trichloride vapor there should be supplied five units of hydrogen. Inasmuch as the hydrogen may contain traces of water, even though the hydrogen is "dried" by any suitable means, which reacts with the boron trichloride to form solid boric acid, the mixing chamber 90 preferably also functions as a trap to catch this solid material and prevent it from passing on to the furnace.

Within the furnace, with the resistor rod temperature at around 1,400° to 1,450° C., the mixture of boron trichloride and hydrogen partakes of a high-velocity circulatory movement, due to the extreme or high temperature differential maintained between the annular region represented by the circularly-arranged upstanding resistors and the external wall of the shell 25, the latter, due to the external heat abstraction by the copious flow of water, being at an external temperature in the neighborhood of the boiling point of water, or less, inasmuch as the rate of flow of water is maintained at a sufficient volume so that substantial vaporization or boiling of the water does not take place. The gaseous mixture within the furnace sweeps upwardly along and throughout the region of the high-temperature resistors and moves downwardly along the lower-temperature walls of the shell 25, due in effect to a thermo-siphonic action brought about by the temperature differential and by the relative disposition of the parts to provide appropriate channels for the respective upward and downward movements of the gaseous mix. This circulation is at very high velocity and thus the mix is repeatedly brought into contact with the high-temperature resistor rods, whence reduction of the boron trichloride to boron takes place with the solid reaction product deposited on the heated resistor rods and the byproduct being hydrogen chloride.

At a lower part of the furnace shell 25 (Fig. 1) I provide a pipe connection 100 which leads, through a suitable flexible section of conduit, to a condenser 101 in which boron trichloride is condensed to liquid form and thus in some measure separated from the HCl which, still in admixture with boron trichloride vapor, is drawn off from the furnace 20 at the outlet 100 at a suitable rate, a rate which may be varied or controlled by a valve 102 and also by the pressure of mixed boron trichloride and hydrogen which it is desired to maintain within the furnace. This latter pressure is preferably relatively low, or as low as possible, and a pressure corresponding to a five-inch or six-inch head of water is suitable. In this manner a continuous renewal of the mix of boron trichloride and hydrogen, supplied through the pipe-line 21 to the top of the shell 25, may be maintained and a continuous withdrawal, through the pipe connection 100 near the bottom, of gaseous reaction products, principally hydrogen chloride with which is included a substantial proportion of unreduced boron trichloride. Intermediate of the supply or renewal point and the withdrawal point, however, the above-mentioned high velocity of thermo-siphonic circulation takes place to insure that the mix is repeatedly brought into thermal relationship between the high-temperature resistor rods.

The condenser 101 is preferably of a construction as shown in Fig. 15, comprising an inner cylindrical sheet-metal container 104 externally heat-insulated in any suitable way as by surrounding it with a sheet-metal jacket 105 and packing the space between the two with a suitable heat-insulating medium, such as rock wool, indicated at 106. Interiorly the condenser is provided with a suitable grating 107 to support crushed solid carbon-dioxide or "dry ice" with which the space above the grating 107 in the inner container 104 is charged through a suitable insulated door 113 provided in the upper part of the condenser. The space below the grating 107 is provided with a pipe connection 108 to which the conduit from the furnace pipe connection 100 leads, so that the byproducts, together with some boron trichloride, are discharged into the condenser below the grate 107.

The upper end of the inner container 104 terminates in a nipple or pipe connection 109 (Fig. 15) to which is connected a large pipe 110 that is provided with a suitable suction apparatus such as a suction fan 111, thus to maintain reduced pressure within the condenser and to draw gaseous products upwardly through the grating 107 and into or through the interstices between the crushed Dry Ice. In this manner boron trichloride that accompanies the withdrawal of the waste gases from the furnace 20 is condensed, taking into solution with it considerable hydrogen chloride, the condensate falling or dropping downwardly and collecting at the bottom of the inner container 104 from which it is withdrawn, through the pipe connection 112, as by continuous overflow, inasmuch as the pipe connection 112 (Fig. 15) is at a lower point than the pipe connection 108, whence it passes on to a boiler 114 (Fig. 1).

The broiler 114 comprises a conveniently cylindrical vessel which may be of sheet steel and in which the condensed boron trichloride, the boiling point of which is below room temperature, boils and thus drives off the dissolved hydrogen chloride which, through a hood 116 and a pipe connection 117 leading to the suction pipe 110, is withdrawn by the suction device 111. The hydrogen chloride handled by the suction device 111 may be exhausted to the atmosphere as a waste or may be recovered, if desired, in any suitable manner.

Through a pipe connection and suitable valves, indicated at 118 in Fig. 1, the condensed boron trichloride, by now substantially freed of hydrogen chloride, may be continuously withdrawn from the boiler and then in vapor form resupplied to the mixing chamber 90 and thus to the furnace 20; this may be effected as by running the condensed boron trichloride to a suitable container 119 having a valved pipe connection coupling it to the pipe-line much in the same manner as the containers 87 are coupled, preferably providing the container 119 with a regulatable heater 88ᵃ to cause it to boil off at a rate preferably commensurate with the rate at which the condenser 101 and boiler 114 recover it, thus to supply it in vapor form to the regulating valves, metering devices, rate-of-flow devices, or the like, through which the mixing chamber is supplied with boron trichloride in vapor form. Thus boron trichloride that is not reduced in the furnace is recycled through the latter, along with newly-supplied boron trichloride from the containers 87. By the valves and heaters for containers 87 and 119, the relative vapor pressures of the boron trichloride they respectively supply may be appropriately regulated to insure recycling of the recovered boron trichloride.

Both the condenser 101 and the boiler 114 are provided at their lower ends with sumps conveniently formed by giving the container structures conical or frusto-conical shape, as indicated at 104ᵃ in Fig. 15 and 114ᵃ in Fig. 1. In the bottoms of these sumps solid materials and sludges can collect, being withdrawn from time to time through the valved pipe connections indicated in Fig. 1.

Illustrative rates of feed of the reactants, for the characteristics of the resistor rods above described, can be hydrogen at the rate of 600 cubic feet per hour and boron trichloride at the rate of forty-two pounds per hour, producing solid reaction product deposited on the resistor rods at the rate of about one pound per hour. The molecular ratio should be as above described, though higher molecular ratios than 1 to 5 may be employed, though preferably not in excess of 1 to 15. In general, good results and good efficiency are achieved even though the rate of withdrawal of byproduct gases from the furnace 20, by way of the pipe connection 100 is accompanied by the withdrawal along with it of boron trichloride in vapor form at a rate of about three-quarters of the rate of initial supply of boron trichloride to the furnace at the pipe connection 22.

Deposited on the high-temperature resistor rods R is the solid reaction product which comprises an initial layer of boron carbide, adhered directly to the graphite rods, and upon that layer is a layer of high purity boron. The latter is obtained at a purity of from 95% to 99%, or better and is in the form of a layer of pure or substantially pure boron with inclusions of boron carbide or boron carbides scattered here and there throughout it, the layer containing as a result, in chemical composition, from about 1% to about 4% or carbon, and there is also present a small fraction of a percent of silicon which may vary in content from about 0.02% to about 0.16%. The outer layer of deposited boron comprises long thin strips and black, finely crystallized lumps with a shining conchoidal fracture. Crystals up to 50 microns are observable under polarized light, and the color in thin sections is yellow to red. The refractive index for Li light is about 2.5 and the density of the boron in 98–99% purity as produced by the process and apparatus is 2.33 gm./cm.³. The table given below indexes the X-ray powder photograph of a sample of the product produced; it is believed that this pattern, which was made with CuKα radiation, contains no lines due to boron carbide inclusions. In this table, which is set forth in two columns, "d" is the spacing of the various reflections in Angstrom units (Å), and "I" is an arbitrary visually estimated scale in which 10 is the strongest line of the pattern and 1 is the weakest.

| Column I | | Column II | |
|---|---|---|---|
| d (Å.) | I | d (Å.) | I |
| 7.74 | 5 | 1.60 | 1 |
| 5.52 | 2 | 1.54 | 4 |
| 5.02 | 10 | 1.447 | 3 |
| 4.66 | 9 | 1.419 | 8 |
| broad 4.43 | 6 | 1.375 | 4 |
| 3.96 | 3 | 1.340 | 7 |
| broad band 3.7–3.4 | 4 | broad band 1.31–1.28 | 3 |
| 2.84 | 7 | broad band 1.26–1.24 | 1 |
| 2.76 | 2 | 1.140 | 2 |
| 2.60 | 4 | 1.083 | 1 |
| 2.46 | 6 | 1.049 | 1 |
| 2.39 | 6 | 1.034 | 1 |
| 2.35 | 2 | 0.969 | 1 |
| 2.19 | 3 | 0.943 | 2 |
| 2.10 | 2 | 0.903 | 1 |
| 2.03 | 4 | 0.888 | 1 |
| 1.75 | 5 | 0.876 | 3 |
| 1.71 | 1 | 0.847 | 3 |
| 1.67 | 3 | 0.838 | 3 |

More particularly, the deposit on the high-temperature resistor rods builds up in three distinguishable layers, of which the first or inner layer is a dull black layer of boron carbide of high boron content, containing about 80 to 85% of boron; this layer is directly adherent to the graphite rods. Over that layer is a thick layer of boron having a characteristic bright luster on broken surfaces thereof and a conchoidal fracture, and overlying that intermediate layer is a thin layer of long, loosely adherent strips. By maintaining full feed of reactants and by maintaining the rod temperature above 1,400° C., the several layers are well defined and more easily separated from each other and from the graphite rods. If the temperature is too low, the layers are poorly defined and are very adherent. To maintain the temperature of the graphite rods at or above 1,400° C., as the process continues, the voltage of the alternating current applied to the bus bars 58 and 59 (Figs. 1 and 2) is increased from time to time, usually being accompanied by a somewhat lesser amperage in the heater circuit at the end of a run than at the beginning, power consumption remaining, in general, more or less constant throughout a run. Also it is preferred that the resistor rods be of relatively large diameter, preferably in excess of half an inch and illustratively two inches as above set forth, and thereby I achieve, in general, improved yield inasmuch as the activity of the surface upon which the deposit is formed, increasing in diameter as the process proceeds, decreases if the rod diameter is too small. It has heretofore been understood that the activity of the heated surface is an inverse function of its radius of curvature, which means that the rate of yield is diminished as the deposited layer increases in thickness and hence increases the radius of the surface upon which the solid reaction product is produced; but I have found that this effect is marked for small radii, but becomes definitely negligible for radii of half an inch or greater, and that the activity of the surface for such greater radii actually increases somewhat with increase in radius, so that I am enabled to achieve some increase in rate of yield with increased length of run.

At the end of a run and after the furnace has been cooled down, the solid material adhered to the graphite rods is removed from the latter, and this is preferably done by removing the loaded rods from the furnace, the shell 25 of which is raised to gain access to the resistor rods from which the heavy graphite cross-connectors $C^1$, $C^2$, and $C^3$ may be removed by lifting them off, accompanied by appropriate tapping, if necessary, whence the loaded rods are individually removed from the sockets 52 of the graphite block supports 50 above described. The several layers may be broken apart and the respective fragments of boron carbide layer segregated and separated from those of the boron layer or layers; the pieces or lumps of the latter may then be sorted out by hand, and in any case the boron fragments are readily identifiable and distinguished from the boron carbide fragments because of the bright silvery fracture of the former. The above-described outermost or third layer is usually easily broken off in strips and comprises boron of maximum purity. The intermediate layer and the innermost boron carbide layer are more adherent to each other, but can be separated by tapping or by gentle hammering.

The sorted boron pieces or lumps may then be crushed and screened, preferably in successive stages, to 60 grit size or thereabouts, and the final crushed product subjected to magnetic separation to remove ferrous particles and the like.

The material of the solid reaction product built up upon the outer cylindrical surfaces of the rods R causes some peculiar physical reactions upon the rods themselves and, therefore, I construct the rods, even though made out of a solid, rigid, hard material like graphite, so that they are yieldable or have some give in a radially inward direction, and in Figs. 9 to 14 I have shown several possible structural forms which the rods R may be given in order to appropriately cope with the peculiar physical reactions of the deposited solid reaction product. Referring first to Figs. 9 and 10, that portion of the rod R intermediate of the two ends that are received in the sockets of the graphite blocks 50 and the connectors $C^1$, $C^2$, and $C^3$ I provide with diametrical slots, about an eighth of an inch wide and extending diametrically through the rod, with successive slots angularly displaced. For example, I cut a sucession of diametrical slots through the rod, each about twelve inches long, successive slots being angularly displaced from each other, illustratively by 90 degrees (see Fig. 10), and the adjacent ends of successive slots overlap each other by two or three inches. Thus slot $S^1$ extends through the rod near the left-hand end for a distance of about twelve inches, its plane being at right angles to the paper; the next slot $S^2$ is of about the same length, but its plane is at right angles to that of slot $S^1$, and the two slots overlap each other as indicated at O in Fig. 8, and so on. This is the preferred construction; a less effective arrangement is that of Figs. 11 and 12, wherein the intermediate portion of the rod is slotted throughout its length at appropriate intervals about its periphery, for example, every 90 degrees, as indicated by the slots $S^4$, the slots being in depth about equal to half the radius or more. Or I may construct the rods as shown in Figs. 13 and 14, in which the slots $S^5$ are all diametrical in extent, can lie in the same plane, and are spaced apart at their adjacent ends to leave intermediate solid portions P of graphite.

As the solid reaction product is built up on the surface of the rod, it exerts a powerful squeezing action upon the rods which, were the rods to be solid and unyielding, could cause breakage or transverse shear of a rod. This appears to take place due to peculiar physical effects. For example, and bearing in mind that the solid reaction product can build up to a radial thickness on the order of three-fourths of an inch, as its external area increases, heat can be lost faster from it while the accompanying increase in radial thickness increases the resistance to radial outward flow in heat. Both of these factors act in a direction to require an increase in the temperature drop through the layer, and the effect is to exert a severe squeezing or compression of the graphite rod. Inner or earlier-produced layers or increments of deposited material are subjected to more and more compression as the thickness of the deposit increases, and through them the squeezing action is exerted upon the graphite rods. Fracture of a resistor rod would require shutting down of the furnace for replacement of the rod or rods.

However, with rods constructed to yield radially inwardly or to have some give due to such slotting as is described above in connection with Figs. 9 to 14, the rods are in large measure relieved of destructive compressive forces and the risk of breakage greatly diminished. Where the slots extend through the rods as in Figs. 9 and 13, the slots are preferably individually of short length, a length, as indicated above, so proportioned in relation to the amperage carried by the parts of the graphite rod that are on each side of a slot that harmful distortion or vibration-producing reaction between the two parts, due to magnetic fields produced by their respective currents, do not take place. The slotted arrangement is also of some advantage in removing the solid reaction products from the rods and aids in lessening the chance of breakage during the operation of such removal. If the slotting is sectional, as in Figs. 9 and 13, appropriate slot lengths are on the order of about ten inches or so, Where the resistor rods are electrically interconnected to form loop circuits as above described and as indicated in Figs. 2, 7, and 8, it is preferred to provide quickly operable means for cutting any loop out of the series circuit in the event that rupture of a rod in a loop were to take place. A convenient means for this purpose may comprise jumpers $J^1$, $J^2$, and $J^3$ (see Fig. 8), each comprising a heavy copper bar 121 (see also Fig. 6) provided at one end with a hole 122 to take onto the threaded end 39 of a terminal connector against the nut 61 of which it may be clamped by a nut 123; at its other end it is provided with a lateral U-shaped slot 124 (Figs. 6 and 8) so positioned that upon swinging the connecting bar in counter-clockwise direction as viewed in Fig. 8, it encompasses the threaded portion of the next adjacent terminal structure against the nut 61 of which it may then be clamped by a nut like nut 123 of Fig. 6. As shown in Fig. 8, the jumpers $J^1$, $J^2$, and $J^3$ are pivotally connected in the above-described manner to the terminal structures of rods $R^1$, $R^3$, and $R^5$ respectively, and by the nuts 123 are clamped and held in the positions shown in Fig. 8. Should a rod of any of the loop circuits rupture, the current is quickly turned off, and the jumper that is pivotally connected to the terminal of one of the rods of the loop circuit which has become defective is loosened up and swung in counter-clockwise direction (in Fig. 8) to bring its U-shaped slot into engagement with the terminal connector of the other rod of that loop circuit, whereupon both ends of the jumper are tightly clamped by the nuts 123, thus short circuiting that particular loop circuit. The current may then again be turned on, but now at reduced voltage, since the resistance of the illustrative series circuit is reduced to two-thirds of what it theretofore had been. The run may thus be concluded by way of the remaining loop circuit, and when the run is concluded and the furnace cooled down to remove the reaction product, a new set of graphite rods is installed and the short-circuiting jumper or jumpers restored to and clamped in open circuit position.

In temporarily cutting off the current supply during a run, as in an instance like that above described, as well as at the conclusion of the run when the furnace is completely cooled off, the drop in temperature of the rods with their deposit brings about relative dimensional changes between the rod and the solid reaction product that also have the effect of squeezing or compressing the rods, thus further risking breakage or rupture; but by making the rods yieldable so that their circumference can lessen in response to a radially inward compressive force exerted by the deposited material, as by slotting them as above described, risk of further breakage during such operational changes in carrying on the process is also diminished or avoided.

The liquid employed in the well W is a liquid that is non-reactive with the constituents of the atmosphere within the furnace shell 25, and is preferably a dense liquid. A suitable illustrative liquid to employ is polychloropropane having a density of 1.7. Mercury could be employed, though under the operating conditions there is some risk of converting some of it into its toxic vapor form. The internal water cooling effected by the ring pipe 85 (Fig. 2), however, can be effective to maintain the temperature of the liquid in the well to a volume at which substantial evaporation, and hence loss thereof does not take place. Preferably also the holes provided in the ring pipe 85 are directed radially inwardly to spray water upon the terminal connector structures L and thus, through the outer metal sleeve 34 thereof, aid in preventing excessive temperature rise of the terminal structures and aid in preventing the latter from communicating heat to the liquid in the well W.

It will be understood that suitable means are provided for varying or controlling the voltage and hence the current supplied to the furnace, as is diagrammatically indicated at 125 in Figs. 1 and 2 of the drawings. By such means the voltage may be varied or controlled to maintain the desired current flow which, as above indicated, is preferably of a magnitude to maintain the temperature of the resistor rods and of the reaction product deposited thereon and upon the surface of which reaction product is progressively deposited in progressive layer-like increments, at a value preferably from about 1,400° C. to about 1,450° C., maintenance of such higher temperature being conducive, as above noted, to better demarcation or definition between the several actual layers built up upon the rod-like mass of graphite, thus to aid in ultimate segregation of the innermost boron carbide layer from the boron layers surrounding it. Operating at higher temperature also lessens the adhesion between the layers and between the boron carbide inner layer and the refractory resistor rod, and thus aids in mechanically separating one from the other. The voltage and current values above set forth are to be understood as illustrative, and by means of the voltage controlling or regulating means, the voltage may be varied or controlled during a run to meet the desired or particular conditions of operation, such as the maintenance of the desired high temperature or suitability of applied voltage to whatever number of loop circuits are operating in the event that one or more is cut out. In general, as the radius of the boron deposit on the resistor rods increases, power input is increased to make sure that the correspondingly increased area of surface upon which the deposit is to be continued is at a high enough temperature. As the boron deposit increases in thickness, to maintain its external surface at the desired high temperature, around 1,450° C., the rate of energy supplied to the resistor rods is increased, and preferably the reaction is stopped and the run halted when the temperature gradient through the deposited boron layer is on the order of 150° C. or somewhat greater, care being here in this manner exercised that the temperature of the boron carbide layer does not reach or exceed that at which boron carbide diffuses into the crystalline boron deposited upon or surrounding it.

Any suitable means may be employed to measure, indicate, record, or determine the temperature of the heated surfaces upon which the deposit is made as above described, and a preferred arrangement for this purpose comprises an optical pyrometer which may be of the indicating or recording type as desired, being diagrammatically indicated in Fig. 1 by the reference character 129 and being suitably positioned externally of the furnace which is provided with suitable sealed light-transmitting means so that rays emanating from the heated surface or surfaces reach the pyrometer apparatus to actuate the latter. As is better shown in Fig. 2, the furnace shell is provided with a tubular extension 130 extending horizontally away from the shell and generally aligned along a radius of the circle about which the resistor elements are grouped as above described; the extension 130 may be of any suitable diameter and in its outer end it has a window or glass disk 131 in sealed connection therewith, the seal being effected in any suitable way as by the use of gaskets or cements, and the window 131 being preferably removably or replaceably mounted as by the use of a clamping collar 132 in threaded connection with the tube-like extension 130. It is along the axis of the extension 130 that the optical pyrometer 129 is aligned, though the diameter of the extension 130 and of the glass window 131 may be suitably large so that lateral and angular shifting of the pyrometer 129 may be effected for better adjustment thereof in relation to the heated surfaces or to one or more of the heated rods in case such an adjustment is desirable during normal operation or in the event that one or more loop circuits is cut out. The extension 130 may be positioned at any desired point in the circumference of the furnace shell 25, the water that runs down the surface of the latter takes part in water-cooling the extension 130, and by terminating the inner end of the latter in the wall 25ª of the shell 25, it does not obstruct the high velocity movements of the gaseous media sweeping vertically along the inner face of the shell wall 25ª and such movement of the gaseous media also coacts in keeping the extension cool, acting as a continuously changing curtain sweeping by the inner open end of the extension 130 and thereby also maintaining a continuous though slow change of atmosphere within the extension 130 to thereby coact in keeping the inner face of the glass window 131 clear of obscuring condensation product. The pressure within the furnace being but slightly above the external atmospheric pressure as above pointed out, the glass window 131 and its sealed junction do not have to withstand substantial pressure differences. Change in energy input by the control means 125 may thus be effected in accordance with the indications or recordings of the pyrometer 129, and thus the desired and preferred surface temperature may be maintained.

The innermost or first above-mentioned deposited layer, being the layer of boron carbide, is a reaction product resulting in effect from two successive reactions, namely, the reduction of boron trichloride at the high temperature to boron and the reaction at the high temperature of the resultant boron with some of the carbon of the refractory resistor rods which, in the illustrative embodiment, are of graphite; as a result the carbon-containing or carbonaceous resistor rod becomes coated with a layer of boron carbide which is highly refractory, the boron carbide refractory layer in effect thereafter protecting the carbonaceous rods from further material reaction of carbon therefrom with the boron and forming in effect a composite refractory resistor element that has a core, in the present instance of graphite, that has very suitable electrical resistivity for high heat production and that has about it and releasably united to it a highly refractory layer of boron carbide of high carbon content, serving as an excellent refractory of good heat conductivity, even though of somewhat lesser electrical conductivity than the graphite core. The high carbon content or carbonaceous character of the graphite is of material advantage, as will now be seen, in the production of the high temperatures electrically, but the innermost layer deposited upon it, of boron carbide, is highly protective in that its carbon is less reactant with boron, with the result that, as above pointed out generally, the outermost portions of the final deposit are substantially pure boron, the innermost and relatively lesser portion (being also of lesser circumferential extent) being of boron carbide of progressively and relatively rapidly diminishing carbon content, thus progressively cutting down the possibility of reaction of boron with carbon.

Thus high purity boron may be effectively produced; it is substantially free of oxygen, nitrogen, and other impurities, except for carbon, the percentage content of which will be seen to be preferably variable according to what portion of the deposit external of the boron carbide layer is selected for use. The outermost layer, as earlier above mentioned, is substantially pure. Though the intermediate layer above mentioned has some carbon content, by crushing it and also crushing the outermost substantially pure layer and mixing the particles resulting from the comminution, the resulting average carbon content remains very low.

The apparatus, furthermore, will be seen to be thoroughly practical and of efficient coactions in carrying on the process. The safety diaphragm 77 (Fig. 2) greatly lessens the possibility of damaging explosion, and it will be noted that by the large lateral cylindrical extension 25ᶜ, in the end of which the diaphragm is mounted, the diaphragm itself is mounted or positioned so as to be protected from direct radiation of heat thereto from the high-temperature reaction surfaces within the furnace, whereby, further protected by the water spray pipes 80 and 81, its intended emergency functioning is assured without modification of its characteristics by heat.

Furthermore, it will be understood that the above description of the process and apparatus with respect to the reduction of a boron compound to boron is illustrative in that the process and apparatus are usable to reduce in a similar manner compounds of other elements such as titanium, thorium, uranium, tungsten, molybdenum, and others.

It will thus be seen that there has been provided in this invention a method and apparatus in which the several objects above noted are successfully achieved and in which an improved product can be produced on a substantial scale. The apparatus is rugged and thoroughly practical, and the method may be dependably carried on.

As many possible embodiments may be made of the mechanical features of the above invention and as the art herein described might be varied in various parts, all without departing from the scope of the invention, it is to be understood that all matter hereinabove set forth, or shown in the accompanying drawings, is to be interpreted as illustrative and not in a limiting sense.

I claim:

1. An apparatus of the character described comprising an enclosure adapted to receive reducible gaseous products and a reducing agent such as hydrogen and having therein a plurality of refractory resistor rods and means engaging them only at their lower ends for supporting them in upstanding and substantially parallel relation spaced interiorly from the walls of said enclosure, means at the lower ends of said refractory resistor rods for making electrical connections to an external source of electrical energy, said enclosure comprising at least two separable parts, one being a bottom part carrying said means supporting said resistor rods therefrom and the other comprising a shell enveloping said rods in spaced relation and having separable sealed connection with said bottom part, whereby upon separation of the two parts, access to said rods is gained, said separable sealed connection comprising a liquid well extending peripherally about said bottom part and receiving therein the lower peripheral portion of said shell, means for withdrawing heat from said shell comprising means for supplying water to its external surfaces, said shell having adjacent its lower end an external skirt overlying said well to prevent ingress of water into said well.

2. An apparatus of the character described comprising an enclosure for receiving vapors of a reducible compound and a gaseous reducing agent, said enclosure having therein at least one pair of refractory resistor rods, means engaging said resistor rods at their lower ends for supporting them in upstanding and substantially parallel relation within said enclosure, means at the lower ends only of said refractory resistor rods for making electrical connections to an external source of electrical energy, means for engaging and electrically connecting the upper ends of each pair of said refractory resistor rods to complete a loop circuit, said enclosure comprising at least two separable parts, one being a bottom part carrying said means supporting said resistor rods therefrom, and the other comprising a shell enveloping said rods in spaced relation and having separable sealed connection with said bottom part, whereby upon separation of the two parts access to said rods is gained.

3. An apparatus useful in the production of boron by the hydrogen reduction of boron trichloride which comprises devices for measuring and mixing gaseous boron trichloride with gaseous hydrogen and for delivering said gaseous mixture to an electric resistance furnace in which the reduction of boron trichloride to boron takes place, said electric resistance furnace comprising a bottom portion and an upper portion, said bottom portion including a bottom plate, said upper portion comprising an enclosing shell, the lower open end of which is separably sealed to said bottom plate, said bottom portion including at least one pair of lead-in conductors fastened to but insulated from said bottom plate, each lead-in conductor being provided with means for supporting a refractory resistor rod in upstanding relation therefrom, long vertically disposed refractory resistor rods having their lower ends received and supported within said supporting means, each rod being electrically connected at its top with the adjacent rod of the pair to form a loop circuit.

4. An apparatus useful in the production of boron by the hydrogen reduction of boron trichloride which comprises devices for measuring and mixing gaseous boron trichloride with gaseous hydrogen and for delivering said gaseous mixture to an electric resistance furnace in which the reduction of boron trichloride to boron takes place, said electric resistance furnace comprising a bottom portion and an upper portion, said bottom portion including a bottom plate, said upper portion comprising an enclosing shell, the lower open end of which is separably sealed to said bottom plate, said bottom portion including at least one pair of lead-in conductors fastened to but insulated from said bottom plate, the portion of each lead-in conductor which lies above the plane of said bottom plate being surmounted by a carbon block of large dimensions and low electrical resistance which is provided on its top surface with a socket, long vertically disposed carbon rods of high electrical resistance having their lower ends received and supported within the respective sockets in said carbon blocks, each rod being electrically connected at its top with the adjacent rod of the pair to form a loop circuit.

5. An apparatus useful in the production of boron by the hydrogen reduction of boron trichloride which comprises devices for measuring and mixing gaseous boron trichloride with gaseous hydrogen and for delivering said gaseous mixture to an electric resistance furnace in which the reduction of boron trichloride to boron takes place, said electric resistance furnace comprising a bottom portion and an upper portion, said bottom portion including a bottom plate, said upper portion comprising an enclosing shell, the lower open end of which is separably sealed to said bottom plate, said bottom portion including at least one pair of lead-in conductors fastened to but insulated from said bottom plate, the portion of each lead-in conductor which lies above the plane of said bottom plate being surmounted by a carbon block of large dimensions and low electrical resistance which is provided on its top surface with a socket, long vertically disposed carbon rods of high electrical resistance having their lower ends received and supported within the respective sockets in said carbon blocks, each rod being electrically connected at its top with the other rod of the pair by means of a large carbon block of low electrical resistance provided with two socket holes for receiving the upper ends of two rods to form a loop circuit.

6. An apparatus useful in the production of boron by the hydrogen reduction of boron trichloride which comprises devices for measuring and mixing gaseous boron trichloride with gaseous hydrogen and for delivering said gaseous mixture to an electric resistance furnace in which the reduction of boron trichloride to boron takes place, said electric resistance furnace comprising a bottom portion and an upper portion, said bottom portion including a bottom plate surrounded by a peripheral well capable of holding a liquid, said upper portion comprising an enclosing shell, the lower open end of which is receivable within said well, and which cooperates with liquid in said well to form a sealed connection between the bottom portion and the upper portion of said furnace, said bottom portion including at least one pair of lead-in conductors fastened to but insulated from said bottom plate, the portion of each lead-in conductor which lies above the plane of said bottom plate being surmounted by a carbon block of large dimensions and low electrical resistance which is provided on its top surface with a socket, long vertically disposed carbon rods of high electrical resistance having their lower ends received and supported within the respective sockets in said carbon blocks, each rod being electrically connected at its top with the other rod of the pair by means of a large carbon block of low electrical resistance provided with two socket holes for receiving the upper ends of two rods to form a loop circuit.

7. An apparatus useful in the production of boron by the hydrogen reduction of boron trichloride which comprises devices for measuring and mixing gaseous boron trichloride with gaseous hydrogen and for delivering said gaseous mixture to an electric resistance furnace in which the reduction of boron trichloride to boron takes place, said electric resistance furnace comprising a bottom portion and an upper portion, said bottom portion including a bottom plate surrounded by a peripheral well capable of holding a liquid, said upper portion comprising an enclosing shell, the lower open end of which is receivable within said well, and which cooperates with liquid in said well to form a sealed connection between the bottom portion and the upper portion of said furnace, said bottom portion including at least one pair of lead-in conductors fastened to but insulated from said bottom plate, each lead-in conductor being provided with a hollow interior and a pipe for delivering cooling fluid to said hollow interior, the portion of each lead-in conductor which lies above the plane of said bottom plate being surmounted by a carbon block of large dimensions and low electrical resistance which is provided on its top surface with a socket, long vertically disposed carbon rods of high electrical resistance having their lower ends received and supported within the respective sockets in said carbon blocks, each rod being electrically connected at its top with the other rod of the pair by means of a large carbon block of low electrical resistance provided with two socket holes for receiving the upper ends of two rods, said upper portion of said furnace being provided with means for applying a cooling fluid thereto.

8. An apparatus useful in the production of boron by the hydrogen reduction of boron trichloride which comprises devices for measuring and mixing gaseous boron trichloride with gaseous hydrogen and for delivering said gaseous mixture to an electric resistance furnace in which the reduction of boron trichloride to boron takes place, said electric resistance furnace comprising a bottom portion and an upper portion, said bottom portion including a bottom plate surrounded by a peripheral well capable of holding a liquid, said upper portion comprising an enclosing shell, the lower open end of which is receivable within said well, and which cooperates with liquid in said well to form a sealed connection between the bottom portion and the upper portion of said furnace, said bottom portion including at least one pair of lead-in conductors fastened to but insulated from said bottom plate, each lead-in conductor being provided with a hollow interior and a pipe for delivering cooling fluid to said hollow interior, the portion of each lead-in conductor which lies above the plane of said bottom plate being surmounted by a carbon block of large dimensions and low electrical resistance which is provided on its top surface with a socket, long vertically disposed carbon rods of high electrical resistance having their lower ends received and supported within the respective sockets in said carbon blocks, each rod being electrically connected at its top with the other rod of the pair by means of a large carbon block of low electrical resistance provided with two socket holes for receiving the upper ends of two rods, said upper portion of said furnace being provided with means for applying a cooling fluid thereto, said upper portion also being provided with connections by which it may be lifted to expose the long carbon rods, and with an outlet pipe which carries off unreacted boron trichloride and hydrogen chloride.

9. An apparatus useful in the production of boron by the hydrogen reduction of boron trichloride which comprises devices for measuring and mixing gaseous boron trichloride with gaseous hydrogen and for delivering said gaseous mixture to an electric resistance furnace in which the reduction of boron trichloride to boron takes place, said electric resistance furnace comprising a bottom portion and an upper portion, said bottom portion including a circular bottom plate supported upon legs and surrounded by an annular well capable of holding a liquid, said upper portion comprising a cylindrical shell, the lower open end of which is receivable within said well, and which cooperates with liquid in said well to form a sealed connection between the bottom portion and the upper portion of said furnace, said bottom portion including a plurality of pairs of lead-in conductors fastened to but insulated from said bottom plate, each lead-in conductor being provided with a hollow interior and a pipe for delivering cooling fluid to said hollow interior, the portion of each lead-in conductor which lies above the plane of said bottom plate being surmounted by a graphite block of large dimensions and low electrical resistance which is provided on its top surface with a socket, long vertically disposed graphite rods of high electrical resistance having their lower ends received and supported within the respective sockets in said graphite blocks, each rod being electrically connected at its top with one of the adjacent rods by means of a large graphite block of low electrical resistance provided with two socket holes for receiving the upper ends of two rods, said upper portion of said furnace being provided with spray pipes for applying a cooling fluid thereto, and with a skirt for preventing cooling fluid from falling into the annular well which holds the liquid used in forming the sealed connection between the bottom and upper portions of the furnace, said upper portion also being provided with connections by which it may be lifted to expose the long graphite rods, and with an outlet pipe which carries off unreacted boron trichloride and hydrogen chloride.

10. An apparatus useful in the production of boron by the hydrogen reduction of boron trichloride which comprises devices for measuring and mixing gaseous boron trichloride with gaseous hydrogen and for delivering said gaseous mixture to an electric resistance furnace in which the reduction of boron trichloride to boron takes place, said electric resistance furnace comprising a bottom portion and an upper portion, said bottom portion including a circular bottom plate supported upon legs and surrounded by an annular well capable of holding a liquid, said upper portion comprising a cylindrical shell, the lower open end of which is receivable within said well, and which cooperates with liquid in said well to form a sealed connection between the bottom portion and the upper portion of said furnace, said bottom portion, including a plurality of pairs of lead-in conductors fastened to but insulated from said bottom plate, each lead-in conductor being provided with a hollow interior and a pipe for delivering cooling fluid to said hollow interior, the portion of each lead-in conductor which lies above the plane of said bottom plate being surmounted by a graphite block of large dimensions and low electrical resistance which is provided on its top surface with a socket, long vertically disposed graphite rods of high electrical resistance having their lower ends received and supported within the respective sockets in said graphite blocks, said graphite rods being longitudinally slotted, each rod being electrically connected at its top with one of the adjacent rods by means of a large graphite block of low electrical resistance provided with two socket holes for receiving the upper ends of two rods, said upper portion of said furnace being provided with spray pipes for applying a cooling fluid thereto, and with a skirt for preventing cooling fluid from falling into the annular well which holds the liquid used in forming the sealed connection between the bottom and upper portions of the furnace, said upper portion also being provided with connections by which it may be lifted to expose the long graphite rods, and with an outlet pipe which carries off unreacted boron trichloride and hydrogen chloride to a condenser which serves to separate the boron trichloride from the hydrogen chloride, and a boiler which returns the unreacted boron trichloride to a container from which it may be recycled to said furnace.

11. An apparatus useful in the production of boron by the hydrogen reduction of boron trichloride which comprises devices for measuring and mixing gaseous boron trichloride with gaseous hydrogen and for delivering said gaseous mixture to an electric resistance furnace in which the reduction of boron trichloride to boron takes place, said electric resistance furnace comprising a bottom portion and an upper portion, said bottom portion including a circular bottom plate supported upon legs and surrounded by an annular well capable of holding a liquid, said upper portion comprising a cylindrical shell, the lower open end of which is receivable within said well, and which cooperates with liquid in said well to form a sealed connection between the bottom portion and the upper portion of said furnace, said bottom portion including a plurality of pairs of lead-in conductors fastened to but insulated from said bottom plate, each lead-in conductor being provided with a hollow interior and a pipe for delivering cooling fluid to said hollow interior, the portion of each lead-in conductor which lies above the plane of said bottom plate being surmounted by a graphite block of large dimensions and low electrical resistance which is provided on its top surface with a socket, long vertically disposed graphite rods of high electrical resistance having their lower ends received and supported within the respective sockets in said graphite blocks, said graphite rods being longitudinally slotted, each rod being connected at its top with one of the adjacent rods by means of a large graphite block of low electrical resistance provided with two socket holes for receiving the upper ends of two rods, said upper portion of said furnace being provided with spray pipes for applying a cooling fluid thereto, and with a skirt for preventing cooling fluid from falling into the annular well which holds the liquid used in forming the sealed connection between the bottom and upper portions of the furnace, said upper portion also being provided with connections by which it may be lifted to expose the long graphite rods, with a safety diaphragm, with a window through which temperature observations can be made and with an outlet pipe which carries off unreacted boron trichloride and hydrogen chloride to a condenser which serves to separate the boron trichloride from the hydrogen chloride, and a boiler which returns the unreacted boron trichloride to a container from which it may be recycled to said furnace.

G. H. FETTERLEY.

REFERENCES CITED

The following references are of record in the file of this patent:

UNITED STATES PATENTS

| Number | Name | Date |
|---|---|---|
| 685,043 | Gibbs | Oct. 22, 1901 |
| 1,019,393 | Weintraub | Mar. 5, 1912 |
| 1,019,394 | Weintraub | Mar. 5, 1912 |
| 1,019,569 | Weintraub | Mar. 5, 1912 |
| 1,058,057 | Hinckley | Apr. 8, 1913 |
| 1,242,339 | Fulton et al. | Oct. 9, 1917 |
| 1,499,317 | Beyer | June 24, 1924 |
| 1,700,942 | Lederer | Feb. 5, 1929 |
| 1,742,286 | Shaw | Jan. 7, 1930 |
| 2,140,228 | Henke | Dec. 13, 1938 |